J. DILLEN.

Assignors to J. Eaton & E. H. Cole.

SAFETY DERRICK LAMP.

No. 7,773. Reissued July 3, 1877.

Witnesses:

A. F. Brundred

C. S. Miller.

Inventor:

Jonathan Dillen

By James C. Boyce his attorney.

N. PETERS, PHOTO-LITHOGRAPHER, WASHINGTON, D. C.

UNITED STATES PATENT OFFICE.

JONATHAN DILLEN, OF KANE CITY, PENNSYLVANIA, ASSIGNOR TO JOHN EATON AND E. H. COLE.

IMPROVEMENT IN SAFETY DERRICK-LAMPS.

Specification forming part of Letters Patent No. 102,663, dated May 3, 1870; Reissue No. 5,114, dated October 29, 1872; Reissue No. 7,773, dated July 3, 1877; application filed March 3, 1877.

*To all whom it may concern:*

Be it known that I, JONATHAN DILLEN, of Kane City, (formerly of Petroleum Centre,) in the county of Venango and State of Pennsylvania, have invented certain new and useful Improvements in Derrick-Lamps, which are fully set forth in the following specification:

My improved lamp is intended to burn crude petroleum as it comes from the wells fresh and gassy. It is to be used, mainly, around oil-wells, and its construction is such as to make it very strong, so that it cannot be easily broken or exploded.

I make the body and wick-tubes, and certain projections on the body, in one continuous and entire piece of strong and tenacious metal, and make it at one casting. By this I secure great strength, and having no joints I avoid all leakages and their consequent dangers.

I make the aperture of the lamp large, so that the lamp can be conveniently filled at the usual oil-tank, or from a bucket or dipper, and so that a man's hand can be introduced to clean the lamp or insert the wicks. With such an aperture it is necessary to have a gas-tight cover, as the oil which will be generally used is very inflammable and explosive.

I provide the lamp with a vent, which is most conveniently placed in the cover. If the oil is very gassy, the gas will issue at this vent, and can be burned there without danger, as the flame will be small and easily extinguished. If the oil used is not gassy, this vent allows air to enter the lamp. In such a case this is necessary, or the oil will not rise freely in the wicks; but if the vent is not inserted, my lamp is strong enough to resist the force of any gas which may collect in it.

Figure 1:
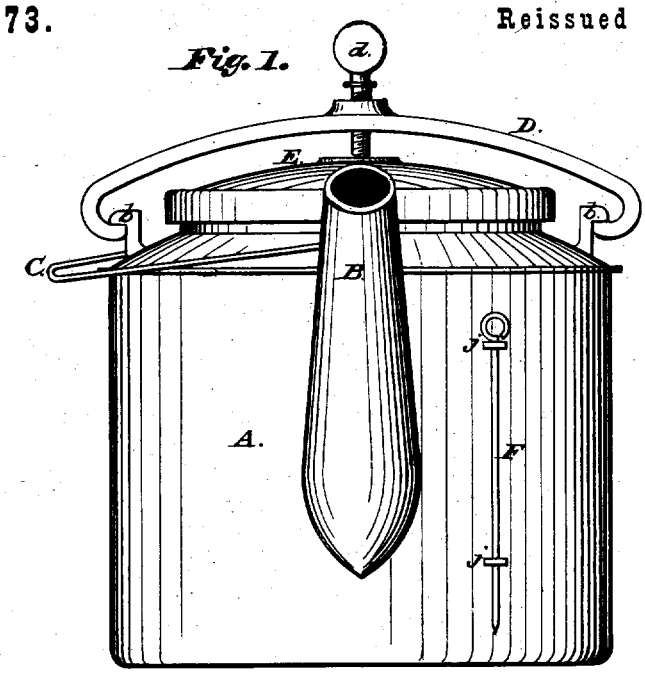
Figure 2:
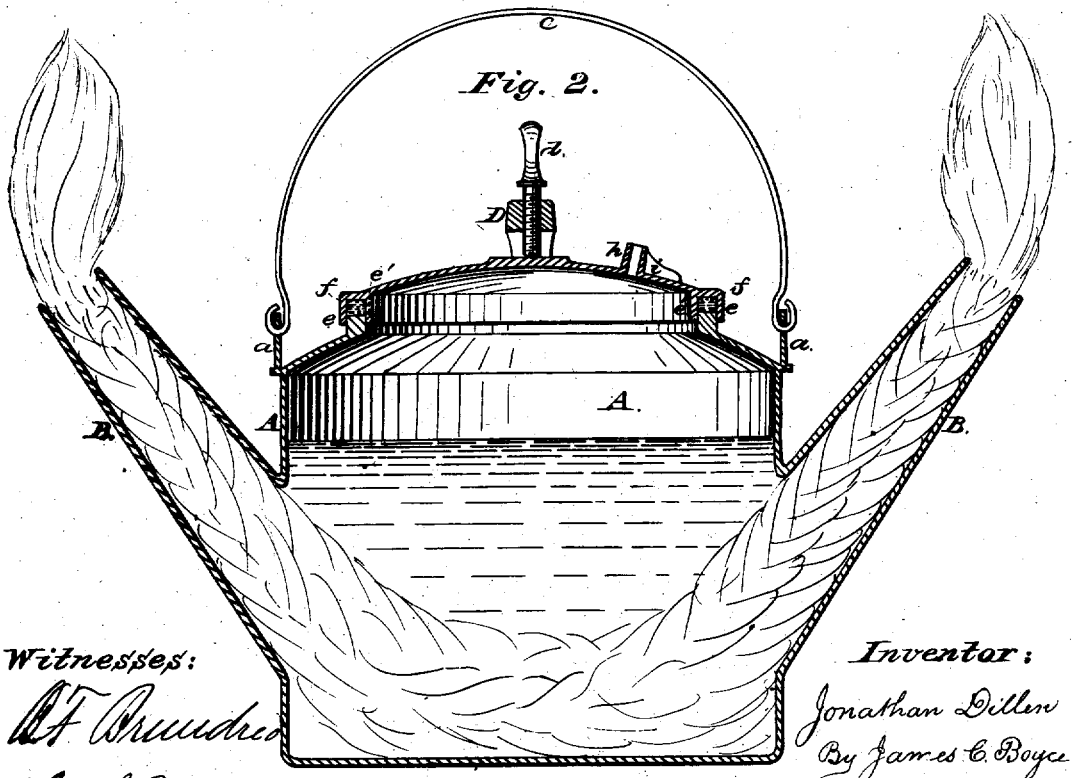

In the accompanying drawing, Figure 1 is an exterior view of my improved lamp. Fig. 2 is a sectional view.

A represents the body of the lamp. B B are the wick-tubes. This lamp is cast in a mold, the wick-tubes B B being of continuous metal with the body A. *a a* are ears, for the reception of the ends of the bail *c;* and *b b* are projections or lugs formed on the sides of the body A. D is a yoke or clamp-bar, the ends of which hook on the lugs *b b*. It is passed over the lid or cover E, and provided with a thumb-screw, *d*, at its center, for the purpose of securing and holding the lid in position. The lid or cover E is constructed with a double rim, *e e'*, in or between which is secured a rubber gasket, *f f*, or other elastic packing, which prevents the escape of gas from the interior of the lamp when the lid is secured in position.

The lid may be made crowning or dished, and with an increased thickness of metal toward the center, so as to give increased strength at the point where the clamp-screw *d* bears upon it. It is provided with a small vent-hole, *h*, which is protected by a shield, *i*, the object of which has been stated.

On the outside of the body of the lamp two or more loops or eyes, *j j*, may be cast, for receiving and holding a rod or hook, F, or any other instrument suitable for trimming or picking the wicks of the lamp.

I do not limit myself to a lamp constructed exactly like that herein shown and described, as it is evident that the details may be considerably modified. For instance, several wick-tubes may be cast in the lamp, if desired, or any form of gas-tight cover may be used, or the vent *h* may be placed on the upper part of the lamp, or the cover may be made to fit so closely that a packing would be superfluous, or the bail may be put on the cover, or a projection might be cast in it for a hook.

I consider it better in all cases to have the upper ends of the wick-tubes full as high as the aperture of the lamp, and the lower ends of such tubes as near the bottom of the lamp as they can be conveniently cast.

What I claim as my invention, and desire to secure by Letters Patent, is—

1. A lamp, constructed substantially as described, having the body A, and wick-tubes B B on such body, with a gas-tight lid or cover and a bail, for the purpose specified.

2. The lid E, having a double rim, *e e'*, with or without rubber packing, in combination with the yoke D, screw *d*, and lamp A, substantially as shown, and for the purpose specified.

3. A derrick-lamp with two wick-tubes on opposite sides, said lamp and tubes being of continuous and entire metal, substantially as shown and described.

4. The combination, in a derrick-lamp, of the body A, wick-tubes B, ears *a*, and bail *c*, substantially as shown and described.

5. A cast-metal derrick-lamp consisting of the body A, wick-tubes B, and projections or ears *a*, all in one and the same piece, and produced at the same operation of casting.

6. A cast-metal derrick-lamp body or bowl, and two or more wick-tubes, all in one and the same piece, and produced at the same operation of casting.

7. In a derrick-lamp, the combination of the body of the lamp, two or more wick-tubes on the sides of such body, and at equal distances apart, and a gas-tight lid, substantially as described.

8. The lamp A, lid E, vent *h*, yoke D, screw *d*, and bail *c*, as constructed, for the purpose specified.

JONATHAN DILLEN.

Witnesses:
F. W. HAYS,
KENTON SAULNIER.